United States Patent
Healy (10) Patent No.: US 10,428,511 B1
(45) Date of Patent: Oct. 1, 2019

(54) APPARATUS FOR PIPELINE REHABILITATION WITH INTERNAL BYPASS

(71) Applicant: Timothy Healy, Indianapolis, IN (US)

(72) Inventor: Timothy Healy, Indianapolis, IN (US)

( * ) Notice: Subject to any disclaimer, the term of this patent is extended or adjusted under 35 U.S.C. 154(b) by 219 days.

(21) Appl. No.: 15/696,142

(22) Filed: Sep. 5, 2017

Related U.S. Application Data (60) Provisional application No. 62/385,965, filed on Sep. 10, 2016.

(51) Int. Cl.

| | |
|---|---|
| *E03F 3/06* | (2006.01) |
| *E03F 3/02* | (2006.01) |
| *E03F 9/00* | (2006.01) |
| *F16L 55/30* | (2006.01) |
| *F16L 55/48* | (2006.01) |
| *F16L 55/40* | (2006.01) |
| *F16L 55/1645* | (2006.01) |
| *B05B 13/06* | (2006.01) |
| *B05B 12/16* | (2018.01) |
| *F16L 101/50* | (2006.01) |
| *F16L 101/12* | (2006.01) |
| *F16L 101/16* | (2006.01) |
| *F16L 101/30* | (2006.01) |

(52) U.S. Cl.
CPC ............... *E03F 3/06* (2013.01); *B05B 12/16* (2018.02); *B05B 13/0636* (2013.01); *E03F 3/02* (2013.01); *E03F 9/007* (2013.01); *F16L 55/1645* (2013.01); *F16L 55/30* (2013.01); *F16L 55/40* (2013.01); *F16L 55/48* (2013.01); *E03F 2003/065* (2013.01); *F16L 2101/12* (2013.01); *F16L 2101/16* (2013.01); *F16L 2101/30* (2013.01); *F16L 2101/50* (2013.01)

(58) Field of Classification Search
CPC .... E03F 3/06; E03F 2003/065; F16L 2101/16
See application file for complete search history.

(56) References Cited

U.S. PATENT DOCUMENTS

| | | | | |
|---|---|---|---|---|
| 4,494,584 A | * | 1/1985 | Rognoni | F16L 55/1283 138/89 |
| 4,980,116 A | * | 12/1990 | Driver | F16L 55/1604 138/98 |
| 5,503,190 A | * | 4/1996 | Kamiyama | B29C 63/0069 138/108 |
| 5,927,341 A | * | 7/1999 | Taylor | B29C 63/28 138/97 |

(Continued)

*Primary Examiner* — Charles Capozzi (57) ABSTRACT

A method is provided for the installation of varied sewer rehabilitation lining materials within an existing sewer while conveying sewage flow through an internal bypass contained on a sled that applies the rehabilitation materials, thus eliminating the need for an expensive, intrusive above grade external bypass. The apparatus is compatible with the various rehabilitation materials, technologies and methodologies currently available in the industry. The method and apparatus can be utilized to restore the original structural integrity of a sewer pipe or to provide a corrosion barrier. Multiple and varied rehabilitation materials (including but not limited to epoxy, geopolymer, mortar, cement, etc.) can be applied using the same apparatus. The apparatus can also be utilized to clean and televise the sewer prior to and during the rehabilitation process.

10 Claims, 5 Drawing Sheets

(56) References Cited

U.S. PATENT DOCUMENTS

| | | | | |
|---|---|---|---|---|
| 6,832,624 B1* | 12/2004 | Rippolone | ............ | F16L 21/035 |
| | | | | 137/15.11 |
| 2003/0039752 A1* | 2/2003 | Winiewicz | .......... | B05B 13/0636 |
| | | | | 427/236 |
| 2005/0200037 A1* | 9/2005 | Sanders | ................ | B08B 9/0553 |
| | | | | 264/36.17 |
| 2016/0017590 A1* | 1/2016 | Shook | .................... | B05D 7/222 |
| | | | | 427/230 |

* cited by examiner

APPARATUS FOR PIPELINE REHABILITATION WITH INTERNAL BYPASS

CROSS-REFERENCE TO RELATED APPLICATIONS

This nonprovisional utility patent claims the benefit of a provisional patent application. The provisional patent has Application No. 62/385,965 with Filing or 371(c) Date of Sep. 10, 2016.

STATEMENT REGARDING FEDERALLY SPONSORED RESEARCH OR DEVELOPMENT (IF APPLICABLE)

Not Applicable

REFERENCE TO SEQUENCE LISTING, A TABLE, OR A COMPUTER PROGRAM LISTING COMPACT DISC APPENDIX (IF APPLICABLE)

Not applicable

BACKGROUND OF THE INVENTION

The present invention relates to a system and technique for rehabilitating underground conduits, such as storm and wastewater sewers. More particularly, though not exclusively, the invention relates to an in situ spray lining system for rehabilitating the sewer pipe without needing to establish an above grade external bypass to carry the sewage flow during the rehabilitation process. Instead, the present invention utilizes an internal bypass.

The wastewater infrastructure in the United States is in poor condition. The American Society of Civil Engineers 2017 Infrastructure Report Card reviewed the condition of the existing wastewater infrastructure and issued a "D+" grade score. Critical sewer interceptors in many of the nation's older communities are 100 years old. The cost of replacing this century old infrastructure is significant, and the physical replacement is often not practical due to multiple decades of development around and often above these key assets. As a result, there has long been a considerable need for rehabilitation technologies that can extend the useful life of existing sewer assets while minimizing project cost and community disruption.

However, most rehabilitation processes are not designed to be performed on an active sewer, and thus, the sewer needs to be taken off-line during the rehabilitation process. This is typically accomplished by setting up a temporary external bypass to carry the sewage around the section that is being rehabbed during the duration of the rehabilitation project. Once the sewer is off-line, the inner wall of the sewer pipe is cleaned and inspected, and then ultimately rehabilitated.

Typically, an above grade external bypass is constructed to allow for the cleaning, inspection and rehabilitation of the sewer pipe. Utilizing an above grade external bypass method typically represents approximately 10% to 20% of the total rehabilitation project costs and adds an additional 4 to 10 weeks to the total rehabilitation project time schedule.

The above grade external bypass method requires appropriate local or state authorized permitting for work in the right-of-way. It requires agreements with property owners whose property is impacted. It causes general disruption when roads, driveways and sidewalks need to be blocked for the duration of the project. It often requires placement of above grade piping across railroad tracks, major roadways, waterways and private property, making the above grade external bypass method expensive and at times functionally impractical.

The above grade external bypass method requires additional authorized permitting to work in any environmentally sensitive areas such as parks, rivers, creek beds, etc. Moreover, there is environmental risk with an above grade external bypass as raw sewage is being pumped above ground where an accident or vandalism may result in a harmful release.

The above grade external bypass method requires coordination of the bypass pumping subcontractor schedules, set-up time, testing, and teardown time. This lengthens the overall rehabilitation project schedule and increases the risk of project delay.

Furthermore, it is challenging to create an accurate sewer rehabilitation project timeline because the visibility to the inner wall of the sewer pipe is not accessible until the above grade external bypass is in place and operational. Only after gaining visibility to the entire inner wall of the sewer pipe, can a complete assessment of the defective sewer pipe be made. At that point, the length of time the above grade external bypass must remain in place is estimated, and the associated disruptions and costs can sometimes increase exponentially.

The above grade external bypass methodology results in increased project cost, disruption to residents, businesses and commuters, heightened permitting requirements, longer project timeframes and increased environmental risk. By utilizing an internal bypass methodology, the sewer rehabilitation can be performed without the additional costs, risks, delays and disruptions associated with utilizing an above grade external bypass.

Use of this internal bypass methodology increases the rate at which sewers can be rehabilitated and reduces the overall costs to property owners, ratepayers, communities and government agencies. By eliminating the significant disruption and expense of an above grade external bypass, many more sewer rehabilitation projects may be completed that otherwise would not have even been attempted. Furthermore, rehabilitation that is currently performed with an internal bypass (sewers approximately 48 inches in diameter or greater utilizing physical manned entry and manual hand spray of rehabilitation material) would increase in cost effectiveness, safety and quality with the utilization of this internal bypass methodology.

Moreover, there have been important advancements in rehabilitation technologies. Long-term studies (i.e. "Evaluation of Protective Coatings for Concrete" performed by County Sanitation Districts of Los Angeles County, Whittier, Calif., December 2004) have documented the performance of a wide array of technologies over long-term controlled exposure to corrosive sewer conditions. While cured in place pipe (CIPP) lining is currently the preferred rehabilitation technology for many communities, there are now many spray applied rehabilitation materials in the industry with numerous documented successful case studies. Utilizing current methods of application (internal or above grade external bypass), these rehabilitation materials are competitive with existing rehabilitation technologies. They are being bid as a competitive alternative to CIPP, particularly for larger diameter projects.

Prior art established the materials utilized in rehabilitation and the method of pumping and spraying the rehabilitation product at a controlled rate.

BRIEF SUMMARY OF THE INVENTION

The present invention provides a means for rehabilitating underground sewers without the need for an above grade external bypass. While the actual nature of the invention covered herein can only be determined with reference to the claims appended hereto, certain aspects of the invention that are characteristic of the embodiments disclosed herein are described briefly as follows.

The apparatus combines existing rehabilitation materials and methodologies (sleds, pulling mechanism, pumping, spraying technologies, etc.) with a unique spraying nozzle or combination of existing nozzles that creates an annular space that allows for the internal bypass. The existing rehabilitation materials, technologies, and methodologies are commercially available. The apparatus would be compatible with existing systems and equipment (chemical mixing and heating equipment, chemical pumps, air pumping systems, etc.). The apparatus would provide the same level of rehabilitation as is currently achieved, but without the incremental costs, challenges, delays, risks etc. associated with the above grade external bypass. The apparatus may also include cleaning nozzles and camera equipment which allows the inner wall of the sewer pipe to be cleaned, televised and rehabilitated by a single contractor in consecutive passes through the sewer pipe. The apparatus would reduce the footprint of the total rehabilitation project, as no excavation, above grade piping, etc. is required.

The nozzle utilized in the apparatus may be a single or multi-head rotating nozzle similar to the nozzles currently used to rehabilitate sewers via the centrifugal cast concrete pipe (CCCP) method, with the nozzle modified to create an annular space through the center of the nozzle to facilitate the internal bypass. The annular space needed for the internal bypass may also be created with a plurality of fixed nozzles that are rotating or stationary.

The use of this unique nozzle configuration, in combination with existing technology, allows for the capture of cost, schedule, permitting, risk and coordination benefits by eliminating the need for the above grade external bypass.

The sled utilized in the apparatus would be similar to those employed in the CCCP rehabilitation method. The sled would be pulled through the sewer pipe at a specified rate, which is coordinated with the chemical feed system to ensure that the appropriate depth of rehabilitation product is applied to the inner wall of the sewer pipe. The sled would differ with the inclusion of the ramps and adjustable counter weight to facilitate the internal bypass moving through the annular space created by the nozzle configuration. The sled may also include cleaning nozzles, shields and cameras that would allow the sewer to be both cleaned and televised without an above grade external bypass. The components, rehabilitation application nozzle(s), cleaning nozzles, shields and cameras can be combined on a single sled, or separated with cleaning nozzles, shields and cameras on one sled and application nozzle(s) on a separate sled (with or without camera(s)). Two sleds would allow for one work crew cleaning and televising while a second crew applies the rehabilitation product (with both crews utilizing the same internal bypass).

Use of the apparatus provides additional benefit when cleaning and televising a sewer. Flow through the sewer can often be too deep or turbulent to clean or televise without an above grade external bypass. This extends the time and associated cost required for the above grade external bypass to be in place. Furthermore, defects below the water line (invert erosion, cracks, roots, etc.) are not visible until the above grade external bypass is functional, so if repairs (reconstruction of invert, pipe patch, etc.) are needed prior to rehabilitation of the sewer, the above grade external bypass must remain in place for an extended, unplanned period of time, increasing the total project cost and disruption to the community.

The ability to both clean and televise the sewer pipe provides additional advantages to both the rehabilitation contractor and the owner of the sewer pipe being rehabilitated. The use of real-time streaming video during the cleaning and rehabilitation would allow the owner to inspect the contractor's performance without incurring the cost of an onsite inspector. This would confirm that the sewer pipe was sufficiently clean before beginning the rehabilitation process. With the incorporation of thickness gauges, there would be confirmation that the appropriate quantity of rehabilitation material was applied to the sewer pipe. For the contractor, a major benefit is streamlining the rehabilitation process. With real-time streaming video, the contractor would not have to wait for an inspector to commute to the job site and physically be in the camera truck to review and approve video of each segment so that the rehabilitation may proceed.

The internal bypass utilized in the apparatus would be flexible hose capable of withstanding high velocity and moderately pressurized flow with a smooth wall low friction interior and exterior that prevents deformation of newly rehabilitated sewer pipe. Inclusion of an element to accelerate the cure of the sprayed rehabilitation product would further prevent deformation of the newly rehabilitated sewer pipe. Low-head, high-flow pumping would allow for significant sewage flow rates to be conveyed through the internal bypass. To collect the sewage flow into the internal bypass, an upstream dam is required. This may be facilitated via a flow through plug, sandbag style dam, construction of temporary bulkhead, etc.

The apparatus can be utilized to provide either structural or non-structural rehabilitation of the existing sewer. By varying the thickness of the rehabilitation material applied to the sewer wall, the apparatus can create a new "stand-alone" sewer within an existing sewer (structural) or a lining of an existing sewer that is itself structurally sound but requires a lining to protect the sewer from degradation, corrosion (i.e. hydrogen sulfide), etc. (non-structural).

The apparatus would also enhance the cost-effectiveness, quality and safety of rehabilitation projects currently being performed by utilizing physical manned-entry with an internal bypass. In this style of rehabilitation, flow is channelized, pumped, etc. such that the majority of the sewer can be rehabilitated with hand-sprayed rehabilitation materials via physical manned-entry into the sewer. Once the rehabilitation material has cured (typically 0.5 to 24 hours), a second mobilization and confined space entry occurs. The internal bypass is shifted, supported, etc. such that the part of the sewer that was blocked by the internal bypass is now accessible for application of the rehabilitation product. Depending on method of application, there may be a third mobilization required. Application of this type is limited to sewers of adequate size to provide the physical space required for the internal bypass along with physical manned-entry. Since physical manned-entry into the sewer pipe is not required, the apparatus thus expands the range of sewers that can be rehabilitated with an internal bypass, with the smallest sewer pipe size that may be rehabilitated being approximately 18 inches in diameter (instead of the current 48 inches).

Use of the apparatus improves the efficiency and cost-effectiveness of sewer rehabilitation currently performed via physical manned-entry with an internal bypass. Sewer rehabilitation with the apparatus takes place in a single mobilization, the entire sewer is cleaned, televised and rehabilitated in consecutive passes through the sewer. This eliminates multiple mobilizations and the associated costs.

The utilization of the apparatus would improve the quality of the work currently performed via physical manned-entry with an internal bypass. The apparatus generates a more uniform application of the rehabilitation material, because the application is controlled by computer programmable logic controller. This would remove the possibility of human error in manual hand-applications.

The apparatus increases worker safety by reducing the risk to the workers that are performing the sewer rehabilitation. The manual hand-application of the rehabilitation material requires workers to spend extended periods of time working in a "confined space". The automation of the application process by the apparatus significantly reduces the amount of time that workers spend in a confined space and also reduces the associated risk. This decreases the incremental costs required to mitigate the risks including, but not limited to, gas monitoring, ventilations, etc. Worker safety is further improved as the number of times workers need to enter a confined space and the total amount of time spent in a confined space is reduced.

BRIEF DESCRIPTION OF THE SEVERAL VIEWS OF THE DRAWING

Although the characteristic features of this invention will be particularly pointed out in the claims, the invention itself, and the manner in which it may be made and used, may be better understood by referring to the following description taken in connection with the accompanying figures forming a part thereof.

FIG. 2 illustrates a more detailed section view of the apparatus shown in FIG. 1. Illustrated is the internal bypass, sled, spray nozzle, cleaning nozzles, shields, cameras, means of sled retraction, counterweight, and internal bypass guide ramps.

FIG. 3 provides a section view of the apparatus shown in FIG. 2. Illustrated is the internal bypass, sled, spray nozzle, cleaning nozzles, shields and cameras.

FIG. 4 illustrates a section view of the disclosure similar to FIG. 1. Illustrated is the sled, spray nozzle, internal bypass pumping system, cleaning nozzles and means of sled retraction as would be utilized during sewer pipe cleaning and televising prior to sewer pipe lining.

FIG. 5 provides a section view of the apparatus shown in FIG. 2 similar to FIG. 3. Illustrated is the internal bypass, sled, cleaning nozzles, shields, cameras and a variation of the spray nozzle.

DETAILED DESCRIPTION OF THE INVENTION

For the purposes of promoting an understanding of the principles of the invention, reference will now be made to the embodiments illustrated in the drawings, specific language will be used to describe the same. It will nevertheless be understood that no limitation of the scope of the invention is hereby intended. Alterations and further modifications in the illustrated devices, and such further applications of the principles of the invention as illustrated herein are contemplated as would normally occur to one skilled in the art to which the invention relates.

In one form, the present invention provides a system and method for rehabilitating sewer pipes without the need for an above grade external bypass. The present invention also increases the quality, safety and cost effectiveness for larger diameter sewers that are currently rehabilitated with an internal bypass and physical manned-entry. The apparatus includes a unique spraying nozzle or combination of nozzles that creates an opening within the apparatus for an internal bypass hose. The internal bypass hose allows for the continuous flow of sewage through the sewer during the rehabilitation process as the sewage is contained within the internal bypass hose, which would be in the form of a pressurized conduit.

The apparatus is compatible with the varied rehabilitation materials, technologies and methodologies that are currently used throughout the industry and allows for rehabilitation of sewers without the need for excavation or an above grade external bypass.

Figure 1:
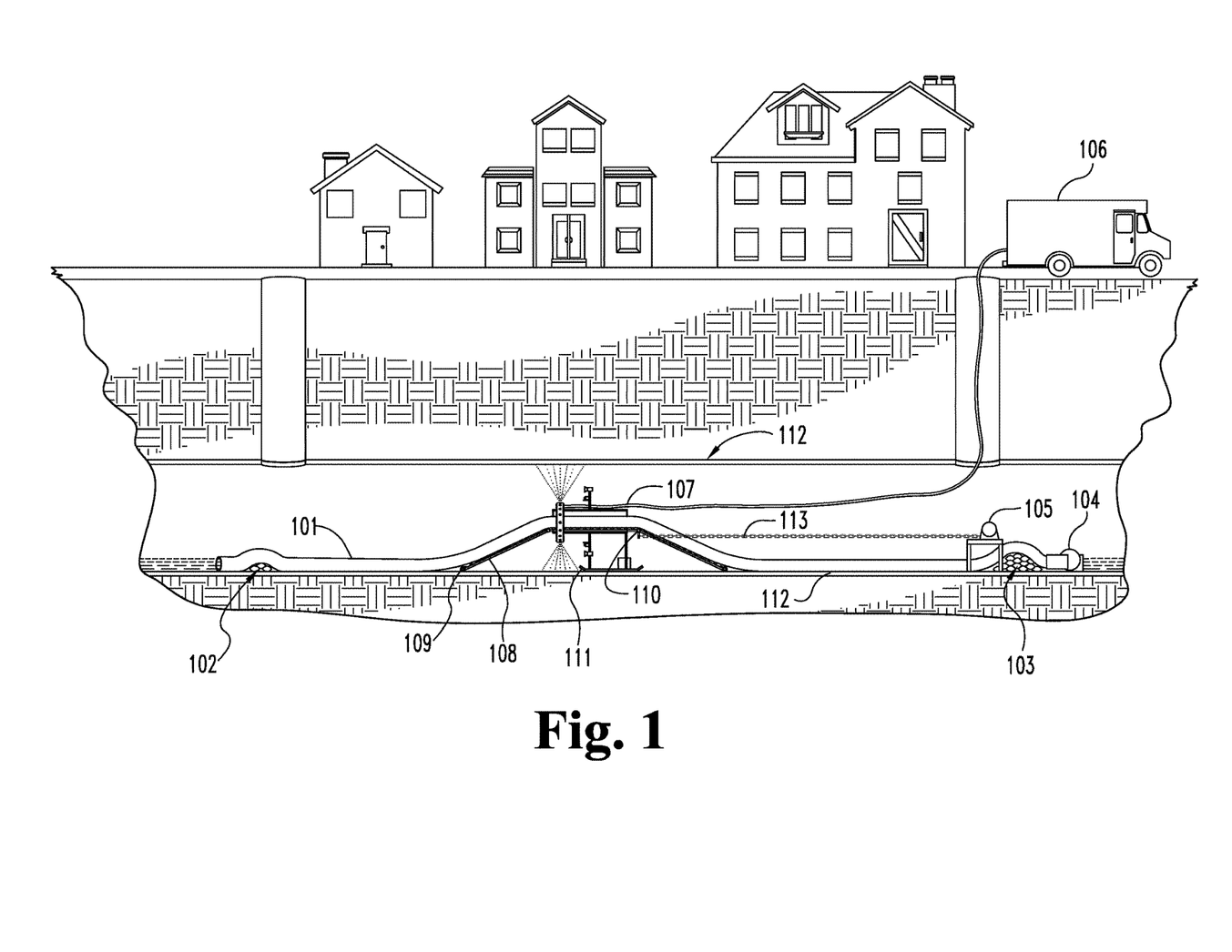
FIG. 1 is a general schematic diagram showing a liner being applied to a section of sewer pipe according to an embodiment. Illustrated is the sled, spray nozzle, internal bypass pumping system and means of sled retraction as would be utilized during sewer lining.

FIG. 1 illustrates a section view of the disclosure. Illustrated is the internal bypass 101 with the internal bypass guide ramps 108, which allows for the conveyance of sewage flow throughout the cleaning, televising and rehabilitation process without above grade disturbance. The guide ramps include a roller or ski 109 and a hinged connection 110 that prevent the apparatus from becoming stuck on holes or offset sewer pipe joints. This allows for lining through sewer segments with slope changes between access manholes. The discharge of the internal bypass into the downstream sewer can run above minor sandbags 102 or a flow through plug if needed because of downstream sewer pipe slopes to prevent the discharged sewage from flowing backwards into the newly rehabilitated sewer pipe. The upstream end of the internal bypass is created by a mound of sandbags 103 or a flow through plug (as required by sewer pipe diameter and dry weather flows) that creates a sump where the pump 104 utilized in the internal bypass is located. The apparatus is pulled through the sewer pipe segment during the rehabilitation process by a motor controlled retrieval system 105 connected to the apparatus via chain, cable, etc. 113 that works in conjunction with the chemical feed pumps 106 which are located above grade with chemical mixing and heating equipment, air compressors, televising camera equipment, etc. This is required for varied types of sewer rehabilitation technologies that supply the rehabilitation material that is sprayed onto the inner wall of the sewer pipe. The amount of chemical pumped to the apparatus is controlled in relation to the speed of the apparatus such that a uniform thickness of the rehabilitation material is applied to the entire sewer segment. The rehabilitation material and other constituents needed to spray the material (air, etc.) are conveyed to the apparatus via supply lines 107. The main sled rests on the sewer pipe via two skis 111. The sewer 112 is illustrated using a simplified double line, where the sewer pipe material of construction as well as sewer wall thickness varies.

Figure 2:
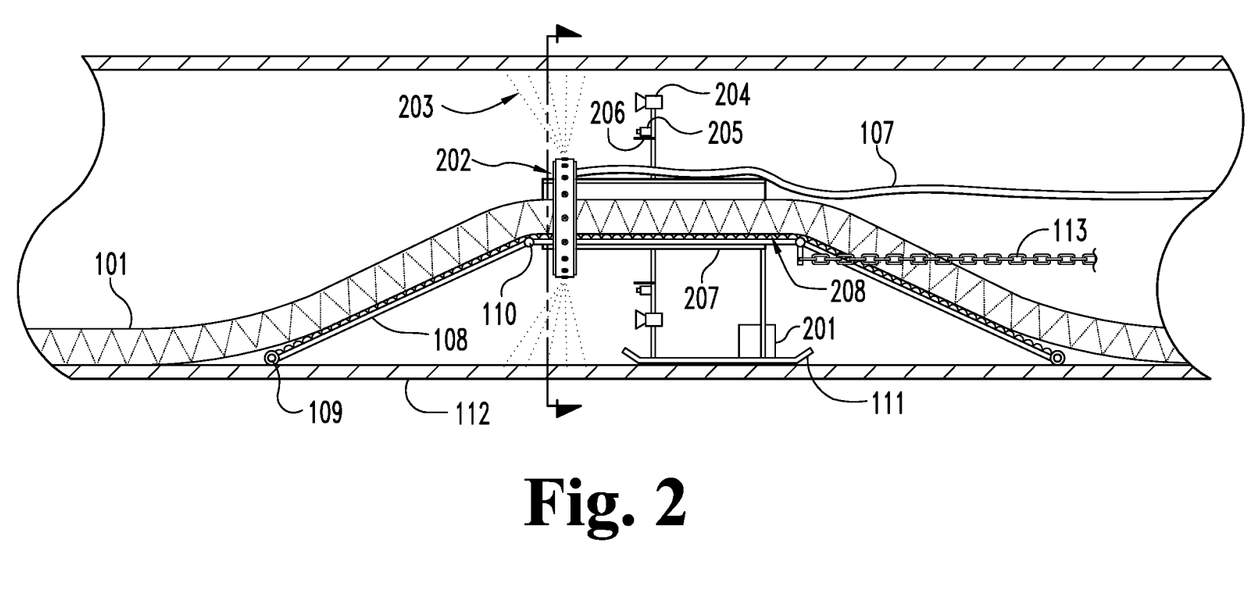

FIG. 2 illustrates a more detailed section view of the apparatus shown in FIG. 1. Illustrated is the internal bypass 101 with the internal bypass guide ramps 108. The guide ramps allow for the internal bypass to move from the invert of the sewer up onto the sled and then travel through the annular space. This creates a section of sewer that is completely visible and unobstructed, which facilitates the cleaning, televising and rehabilitating of the sewer. The guide ramps detach from the main sled 207 to allow the apparatus to be assembled in the below grade sewer (if required due to space limitations). The guide ramps include a roller or ski 109 and a hinged connection 110 that prevent the apparatus from becoming stuck on holes or offset sewer pipe joints. This allows for lining through sewer segments with slope changes between access manholes. The guide ramps may include an element that would accelerate the cure of the rehabilitation material along the sewer invert. This element that accelerates the rate of cure for the rehabilitation material may work by a variety of mechanisms; infrared heater, ultraviolet light, etc. or simply a unit heater that is lowered into the upstream or downstream manhole that increases the temperature in the entire sewer. The rate of cure of the product along the sewer invert dictates the speed at which the sled can move through the sewer while applying the product. The guide ramps also reduce the probability of kinks developing in the internal bypass piping. The main sled 207 rests on the sewer pipe via two skis 111. The skis have curved edges on both ends to allow the apparatus to travel over holes, offset sewer pipe joints, etc. while moving either direction through the sewer as needed for either the cleaning, televising or rehabilitation process. The rehabilitation material and other constituents needed to spray the material (air, etc.) are conveyed to the apparatus via supply lines 107. The spray nozzle 202 allows for the creation of an annular space within the apparatus, which makes possible the internal bypass and the uniform application of the various rehabilitation materials 203. The high pressure cleaning nozzles 204, cameras 205 and shields 206 are attached to the main sled 207. The apparatus includes a counterweight 201 to balance the sled. The counterweight is removable and adjustable such that the sled weight remains balanced in various applications. Rollers 208 may also be included on the main sled 207 between the sled and the internal bypass 101 to facilitate the smooth and controlled movement of the internal bypass across the sled. The apparatus is pulled through the sewer pipe segment during the rehabilitation process by a motor controlled retrieval system connected to the apparatus via chain, cable, etc. 113. The sewer 112 is illustrated using a simplified representation, where the sewer pipe material of construction as well as sewer wall thickness varies.

Figure 3:
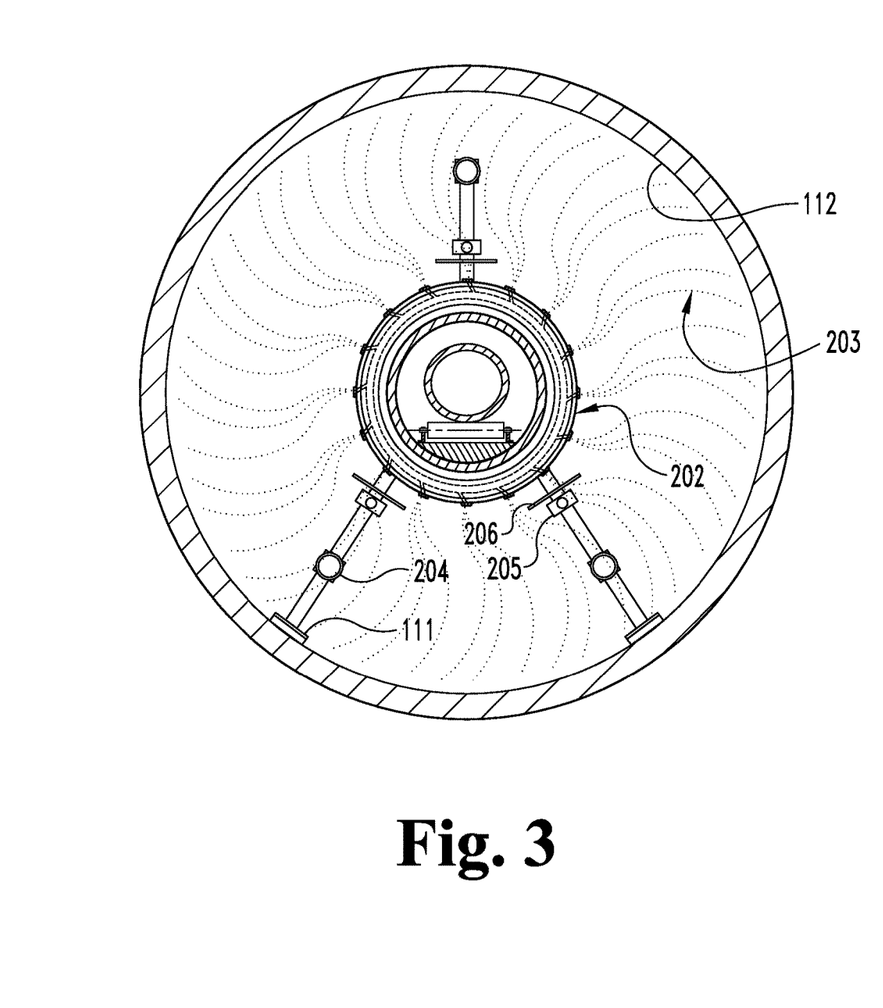

FIG. 3 illustrates a more detailed section view of the apparatus shown in FIG. 2. Illustrated is the spray nozzle 202 that allows for the creation of an annular space within the apparatus making possible the internal bypass. The spray nozzle contains a single feed connection which allows contractors to utilize existing rehabilitation equipment and creates very uniform application of the various rehabilitation materials 203. The spray nozzle rotates while distributing the various rehabilitation materials across the inner wall of the sewer pipe 112. The main sled 207 rests on the sewer pipe 112 via two skis 111. The high pressure cleaning nozzles 204 are attached to the main sled 207 and evenly spaced to provide full coverage of the inner wall of the sewer pipe 112. The cameras 205 are attached to the main sled 207 and evenly spaced such that in total the images generated by the cameras allow for an unobstructed viewing of the entire inner wall surface of the sewer pipe 112. The images from the cameras may be viewed in real time as three distinct videos in the on-site above grade vehicle or off site via real-time video streaming. Post processing of the videos allows for the combination of the views into a single view of the entire sewer. The combination of cleaning nozzles and cameras used in conjunction with the internal bypass allows for the entire inner wall surface of the sewer pipe to be cleaned, televised and then rehabilitated without need for any above grade external bypass. The shields 206 are illustrated to protect the cameras and cleaning nozzles from over spray generated by the spray nozzle 202. The sewer 112 is illustrated using a simplified representation, where the sewer pipe material of construction as well as sewer wall thickness varies.

Figure 4:
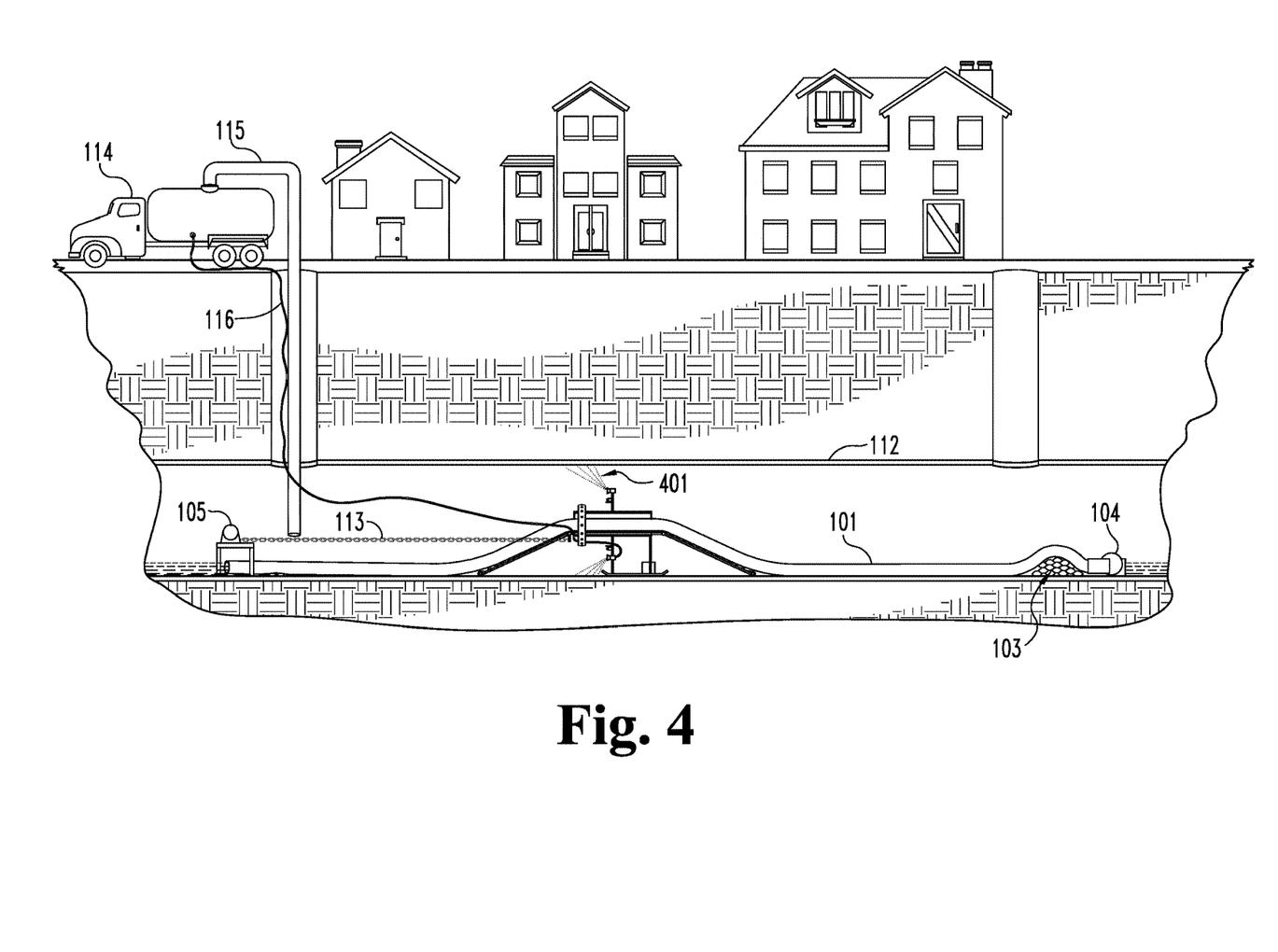

FIG. 4 illustrates the apparatus as it would be used during sewer pipe cleaning and televising prior to sewer rehabilitation. The three high pressure cleaning nozzles 204 are supplied with water 116 from a vac-truck 114 resulting in a uniform spray of water 401 across the interior of the sewer 112. The cleaning nozzles are supplied with water 116 as is currently used by contractors performing sewer cleaning services. The apparatus is pulled towards the downstream manhole moving debris and grit to the downstream manhole where it is removed by the vac-truck suction hose 115 as is currently used by contractors performing sewer cleaning services. The motor controlled retrieval system 105 connected to the apparatus via chain, cable, etc. 113 used to pull the apparatus through the sewer for cleaning purposes can also be utilized during the application of the rehabilitation material. Placing a motor controlled retrieval system 105 both upstream and downstream of the sewer segment to be rehabilitated would allow the apparatus to be pulled both directions (upstream and downstream) thus creating the ability to clean, televise and rehabilitate the sewer in consecutive passes without need for an above grade external bypass. The internal bypass 101 allows for the conveyance of sewage flow throughout the cleaning, televising and rehabilitation process. The upstream end of the internal bypass is created by a mound of sandbags 103 or a flow through plug (as required by sewer pipe diameter and dry weather flows) that creates a sump where the pump 104 utilized in the internal bypass is located. The sewer 112 is illustrated using a simplified double line, where the sewer pipe material of construction as well as sewer wall thickness varies.

Figure 5:
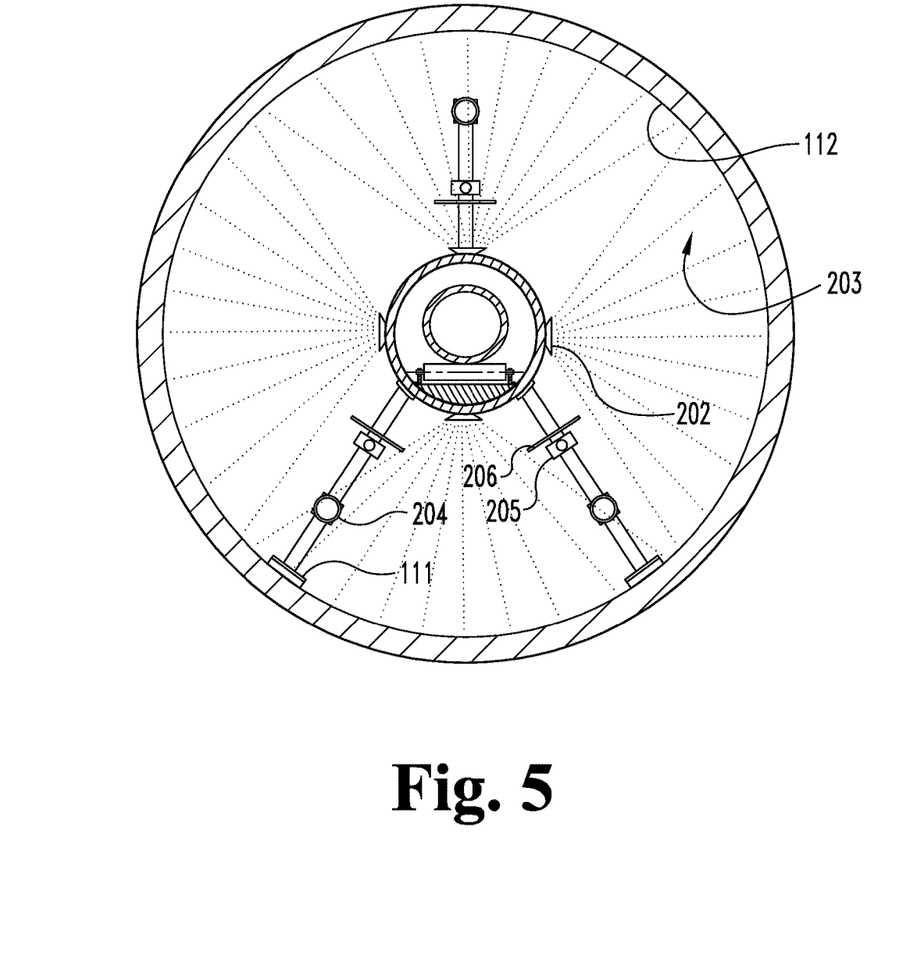

FIG. 5 provides a section view of the apparatus shown in FIG. 2 similar to FIG. 3. It illustrates a second spray nozzle 202 configuration. The spray nozzles allow for the creation of an annular space within the apparatus making possible the internal bypass. The rehabilitation materials 203 would be evenly divided between the fixed spray nozzles and each spray nozzle would spray a portion of the inner wall of the sewer pipe 112. The division of the rehabilitation materials may be accomplished by utilizing individual chemical feed pumps 106 for each nozzle or via a flow splitting device on the apparatus. This automated application method creates a very uniform application of the various rehabilitation materials 203. The main sled 207 rest on the sewer pipe 112 via two skis 111. The high pressure cleaning nozzles 204 are attached to the main sled 207 and evenly spaced to provide full coverage of the inner wall of the sewer pipe 112. The cameras 205 are attached to the main sled 207 and evenly spaced, such that in total the images generated by the cameras allow for an unobstructed viewing of the entire inner wall surface of the sewer pipe 112. The shields 206 are illustrated to protect the cameras and cleaning nozzles from over spray generated by from the spray nozzle 202. The sewer 112 is illustrated using a simplified representation, where the sewer pipe material of construction as well as sewer wall thickness varies.

While the invention has been illustrated and described in detail in the drawings and foregoing description, the same is to be considered as illustrative and not restrictive in character. Only certain embodiments have been shown and described, and all changes, equivalents, and modifications that come within the spirit of the invention described herein are desired to be protected. The specifics of this description and the attached drawings should not be interpreted to limit the scope of this invention to the specifics thereof. Rather, the scope of this invention should be evaluated with reference to the claims appended hereto.

What is claimed is:

1. A system for the rehabilitation of underground sewer pipe, comprising: an internal bypass for a section of sewer pipe to be rehabilitated, the internal bypass constructed and arranged to divert the flow through the section of sewer pipe from an upstream location to a downstream location through a length of flexible bypass hose that is disposed within the sewer; and a sewer rehabilitation device having a length that is shorter than the length of the flexible bypass hose, the sewer rehabilitation device constructed and arranged to move through the section of sewer pipe along the flexible bypass hose, elevating the flexible bypass hose as it moves along the hose so as to position the hose between an invert and a crown of the sewer pipe so as to create an application area in which the flexible bypass hose is spaced from a surrounding inner wall of the sewer pipe, the application area allowing rehabilitation materials to be sprayed onto the inner wall of the sewer pipe.

2. The system of claim 1 in which the sewer rehabilitation device includes one or more fixed or rotating nozzles for spraying a rehabilitation material onto the inner wall of the sewer pipe.

3. The system of any preceding claim in which the sewer rehabilitation device includes one or more cleaning nozzles for spraying a cleaning material onto the inner wall of the sewer pipe.

4. The system of any preceding claim in which the sewer rehabilitation device includes one or more cameras for inspecting the inner wall of the sewer pipe.

5. The system of any preceding claim in which the sewer rehabilitation device includes one or more internal bypass hoses.

6. The system of any preceding claim in which the sewer rehabilitation device includes one or more elements to heat, dry, or accelerate the rate of cure of the rehabilitation materials.

7. The system of any preceding claim in which the sewer rehabilitation device includes a front section, a rear section, and an intermediate section disposed between the front and rear section, wherein the front section includes a ramped surface for guiding the hose from the inner wall of the sewer pipe onto the intermediate section as the device is advanced along the sewer pipe in a first direction.

8. The system of claim 7 in which the intermediate section includes a guiding surface for maintaining the hose in an orientation generally parallel to the surrounding inner wall of the sewer pipe.

9. The system of claim 8 in which the front section includes one or more guiding members configured to guide the hose up and onto the ramped surface.

10. The system of claim 9 in which the rear section includes one or more guiding members configured to guide the hose down from the intermediate section to the inner wall of the sewer pipe.

* * * * *